(12) United States Patent
Christie et al.

(10) Patent No.: US 6,378,023 B1
(45) Date of Patent: Apr. 23, 2002

(54) INTERRUPT DESCRIPTOR CACHE FOR A MICROPROCESSOR

(75) Inventors: David S. Christie, Austin; Brian C. Barnes, Round Rock, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/481,005

(22) Filed: Jan. 10, 2000

Related U.S. Application Data

(63) Continuation of application No. 08/601,619, filed on Feb. 14, 1996, now abandoned.

(51) Int. Cl.$^7$ .............................................. G06F 13/24
(52) U.S. Cl. ...................................................... 710/260
(58) Field of Search ................................ 710/260–269

(56) References Cited

U.S. PATENT DOCUMENTS

| | | | |
|---|---|---|---|
| 4,519,032 A | 5/1985 | Mendell | |
| 4,669,043 A | 5/1987 | Kaplinksy | |
| 4,819,154 A | 4/1989 | Stiffler et al. | |
| 4,914,578 A | 4/1990 | MacGregor et al. | |
| 5,247,639 A | 9/1993 | Yamahata | |
| 5,276,852 A | 1/1994 | Callander et al. | |
| 5,418,956 A | * 5/1995 | Willman ..................... | 395/700 |
| 5,517,626 A | 5/1996 | Archer et al. | |
| 5,555,395 A | 9/1996 | Parks | |
| 5,557,759 A | 9/1996 | Crump et al. ............... | 395/309 |
| 5,594,914 A | 1/1997 | Coomes et al. | |
| 5,613,128 A | 3/1997 | Nizar et al. | |
| 5,636,374 A | 6/1997 | Rodgers et al. | |
| 5,652,872 A | 7/1997 | Richter et al. | |
| 5,724,549 A | 3/1998 | Silgas et al. | |
| 5,727,227 A | 3/1998 | Schmidt et al. | |
| 5,765,195 A | 6/1998 | McDonald | |
| 5,850,555 A | 12/1998 | Zureski et al. | |
| 5,895,489 A | 4/1999 | Hammond et al. | |
| 5,948,093 A | 9/1999 | Swanstrom et al. | |

OTHER PUBLICATIONS

Hamacher et al., Computer Organization, McGraw–Hill Publishing Company, 1990, p. 472.
Intel, "Military i386 SX microprocessor", pp. 1–98, Feb. 1994.*
Intel Corp., "Multiprocessor Specification", Version 1.1, Apr., 1994, pp. 1.1–Glossary 2.
Hummel, "PC Magazine Programmer's Technical Reference: The Processor and Coprocessor", 1992, pp. 153–182.
Intel Corp., "Microprocessor & Peripheral Handbook–vol. I Microprocessor", 1989, pp. 2–259 through 2–277.
Singh, et al., "16–Bit Microprocessors Architecture, Software, and Interfacing Techniques", 1991, pp. 302–305.
Ron Wilson, "Multiple Instruction Dispatch Drivers RISC chips to 66 Mips", Computer Design, vol. 28, No. 19, p. 22(3).
Warren Andrews, "RISC Finding A Place in Real–Life Applications", Computer Design, vol. 32, No. 8, p. 67(5).
Todd Wynia, "RISC and CISC Processors Targe Embedded Systems", Electronic Design, vol. 39, No. 12, p. 55 (7).
Jim DeTar, "Intel Readies New i960 Processors", Delectronic News, vol. 40, No. 2034, p. 66(2).

* cited by examiner

Primary Examiner—John A. Follansbee
(74) Attorney, Agent, or Firm—Conley, Rose & Tayon, PC; Robert C. Kowert

(57) ABSTRACT

An interrupt descriptor cache for a microprocessor is provided which is configured to store interrupt information associated with a plurality of interrupt vectors. Prior to fetching interrupt information from a main memory of a computer system, the microprocessor searches the interrupt descriptor cache. If the interrupt information is stored therein, the address of the interrupt service routine is formed from the stored interrupt information instead of fetching the interrupt information from main memory. The interrupt descriptor cache is additionally configured to monitory memory accesses for updates to the interrupt information stored therein. If a memory location storing interrupt information is updated, then the interrupt descriptor cache invalidates any storage locations which may be storing the information.

20 Claims, 6 Drawing Sheets

INTERRUPT DESCRIPTOR CACHE FOR A MICROPROCESSOR

This application is a continuation of Ser. No. 08/601,619 filed Feb. 14, 1996 now abandoned.

BACKGROUND OF THE INVENTION

1. Field of the Invention

This invention is related to the field of microprocessors and, more particularly, to interrupt handling mechanisms within microprocessors.

2. Description of the Relevant Art

Modern computer systems and the software which runs thereon demand a high performance interrupt structure order to operate efficiently. Interrupts are often used to switch between tasks, and so a multi-tasking operating system benefits from a high performance interrupt structure. A "multi-tasking" operating system is configured to run multiple programs concurrently. Additionally, interrupts provide a means for an electronic device external to the microprocessor to request attention from the operating system. Modern day computer system are including increasing numbers of these electronic devices, prompting the need for a high performance interrupt structure.

Interrupts cause a microprocessor within the computer system to suspend execution of a task and to execute a specific software routine (referred to as an interrupt service routine) comprising a set of instruction. The interrupt is typically unrelated to the instruction being executed by the microprocessor at the time the interrupt occurs. Instead, the interrupt is caused by an external device requiring software attention. For example, a buffer within an input/output device may fill with data to be transferred to another device or to memory. Many other sources for interrupts are well-known to the skilled artisan.

The instruction being executed by the microprocessor at the time the interrupt occurs are referred to herein as a "task". A task may be a portion of a program, an operating system routine, or even another interrupt service routine.

Because the interrupt is normally unrelated to the task being performed by the microprocessor and is asynchronous to the task itself, the interrupt service routine is executed in such a way that the task may be resumed. In order to resume the task, the "context" within which the task is executing may be saved to memory. The context includes register values associated with the task when the task is interrupted. Additionally, the context may include the values within any memory locations that may be accessible to the task. Handling of an interrupt via saving the context and establishing a context for the interrupt service routine is referred to as a "task switch". After saving the context, the interrupt service routine is executed. Upon completion of the interrupt service routine, the context is restored to the microprocessor and the task is resumed. Since the restored context is identical to the context when the task was interrupted, the task executed normally. In other words, the interrupt has no effect on the results of executing the task. Instead, only the time required to execute the task is affected.

Often, an interrupt service routine will only require access to a few registers within the register set to perform its function. In this case, full context save is not necessary since some registers will not be modified by the interrupt service routine. Instead, only those storage locations which must be changed in order to fetch the instructions within the interrupt service routine need be saved prior to beginning execution of the interrupt service routine. For example, in the x86 architecture the EIP register and CS segment register (which define the address and segment of the instructions to be fetched and executed) and the flags register (which is modified by many of the x86 instructions) are saved. These values are pushed onto the stack defined by the x86 architecture when the task switch method of interrupt handling is not being used.

When the task switch method of interrupt handling is not in use, an interrupt service routine saves the values stored within registers which it employs to carry out its intended function. This method of interrupt handling is referred to as an interrupt gate or trap gate in the x86 architecture, depending on whether or not the interrupt service routine may itself be interrupted.

Regardless of the whether or not the task switch method of interrupt handling is in use, the interrupt service routine must be located in memory. Since there may be multiple sources of interrupts, many computer systems provide a mechanism for identifying one of multiple interrupt service routines. The computer system thus provides flexibility to programmer in that a particular interrupt service routine may be tailored to the needs of a particular device.

One method for providing the address of the interrupt service routine for a given interrupt is for the microprocessor to request an interrupt vector from another electronic device in the system. An "interrupt vector" is a number which is indicative of a particular interrupt service routine. For example, the interrupt vector may be an index into an interrupt descriptor table which provides information identifying the address of the associated interrupt service routine. As used herein, an interrupt descriptor table is a set of memory locations which specifies interrupt information for each interrupt vector. "Interrupt information" refers to information identifying an interrupt service routine in memory. This interrupt information may include segment information identifying the segment in which the interrupt service routine lies, as well as an offset within the segment identifying the beginning of the interrupt service routine. Furthermore, interrupt information may include attributes of the segment.

A segment is a mechanism for providing address translation. Many microprocessor architecture specify a memory model that involves address translation. Before an address identifying an instruction or data in memory is presented to the memory, that address is modified by the microprocessor. During the modification, attributes of the segment may be compared to attributes of the task and to the nature of the access to ensure that the task is performing an appropriate action within the segment. As used herein, the term "segment" refers to a portion of a main memory. "Segment attributes" refer to attributes associated with the segment. It is noted that a segment may be defined as an instruction (or code) segment containing instructions, a data segment, or an interrupt segment. Segment attributes may include protection information identifying the allowable access to the segment, a base address identifying the beginning of the segment, a limit identifying the size of the segment, and a selector identifying the entry within the table storing other segment attributes.

Segment information, such as segment attributes, is often stored in a set of memory locations referred to as a descriptor table. For example, the x80 microprocessor architecture defines the aforementioned interrupt descriptor table as well as a global descriptor table. The global descriptor table may contain segment information regarding code, data, or interrupt segments. The interrupt descriptor table contains segment information regarding interrupt segments. It is noted that, in one embodiment, a portion of the interrupt segment information is located in the interrupt descriptor table. The remainder of the interrupt segment information is located in the global descriptor table.

Unfortunately, transferring interrupt information from the memory locations comprising descriptor tables to the microprocessor often requires many clock cycles to complete. Furthermore, the interrupt information identifies a segment, and additional information related to the segment is fetched from the global descriptor table. Ever more clock cycles are used to perform the global descriptor table fetch. As used herein, a clock cycle refers to the amount of time required by portions of the microprocessor to perform their functions. The results of each function are stored in a storage location (e.g. a register or memory) according to a clock signal defining the clock cycle and may be used by another function in the next clock cycle. The bus used by a microprocessor to communicate with other electrical devices may operate according to a different clock cycle than the microprocessor itself. The clock cycle associated with the bus is often referred to as the bus clock cycle. The clock cycles and bus clock cycles spent awaiting the interrupt information may reduce performance of the microprocessor, since the interrupt service routine cannot be located until the interrupt information is transferred and processed. A microprocessor configured to perform interrupts in a higher performance fashion is desired.

SUMMARY OF THE INVENTION

The problems outlined above are in large part solved by a microprocessor configured with an interrupt descriptor cache. The interrupt descriptor cache is configured to store interrupt information associated with a plurality of interrupt vectors. Prior to fetching interrupt information from a main memory of a computer system, the present microprocessor searches the interrupt descriptor cache. If the interrupt information is stored therein, the address of the interrupt service routine is formed from the stored interrupt information. Advantageously, the interrupt service routine may be entered more quickly by determining the address of the interrupt service routine internally to the microprocessor. Clock cycles saved due to the reduced interrupt latency are available for performing tasks. Performance of the microprocessor and a computer system employing the microprocessor may be advantageously increased.

The interrupt descriptor cache is additionally configured to monitor memory accesses for updates to the interrupt information stored therein. If a memory location storing interrupt information is updated, then the interrupt descriptor cache invalidates any storage locations which may be storing the information. In this manner, the interrupt information stored within the interrupt descriptor cache is maintained coherent with respect to any changes that may be made to the interrupt information.

In one embodiment, the interrupt descriptor cache includes fewer storage locations than the number of possible interrupt vectors within the microprocessor architecture. In many cases, computer systems into which the microprocessor is employed limit the number of unique interrupt vectors which may be defined. Advantageously, the interrupt descriptor cache may include storage locations sufficient to store a small number of interrupt vectors while still retaining much of the performance advantage that a larger storage may engender. Silicon area used to implement the interrupt descriptor cache may be reduced without constituting a performance impact.

Broadly speaking, the present invention contemplates a microprocessor comprising an interrupt descriptor cache and a control unit. The interrupt descriptor cache includes a plurality of storage locations. Each one of the plurality of storage locations is configured to store interrupt information associated with an interrupt vector. The control unit is configured to cause the interrupt information to be stored into the interrupt descriptor cache and further configured to transfer the interrupt information across a bus.

The present invention still further contemplates a method for storing interrupt information associated with an interrupt vector within a microprocessor comprising several steps. Interrupt information is transferred from a main memory coupled to the microprocessor into the microprocessor upon a first occurrence of the interrupt vector. The interrupt information is stored within an interrupt descriptor cache and retrieved from the interrupt descriptor cache upon a second occurrence of the interrupt vector.

The present invention still further contemplates a computer system comprising a microprocessor coupled to an interrupt controller. The microprocessor is configured to store interrupt information associated with a plurality of interrupt vectors. The interrupt controller is configured to convey the interrupt vector to the microprocessor according to a plurality of interrupt request signals.

BRIEF DESCRIPTION OF THE DRAWINGS

Other objects and advantages of the invention will become apparent upon reading the following detailed description and upon reference to the accompanying drawings in which.

Figure 1:
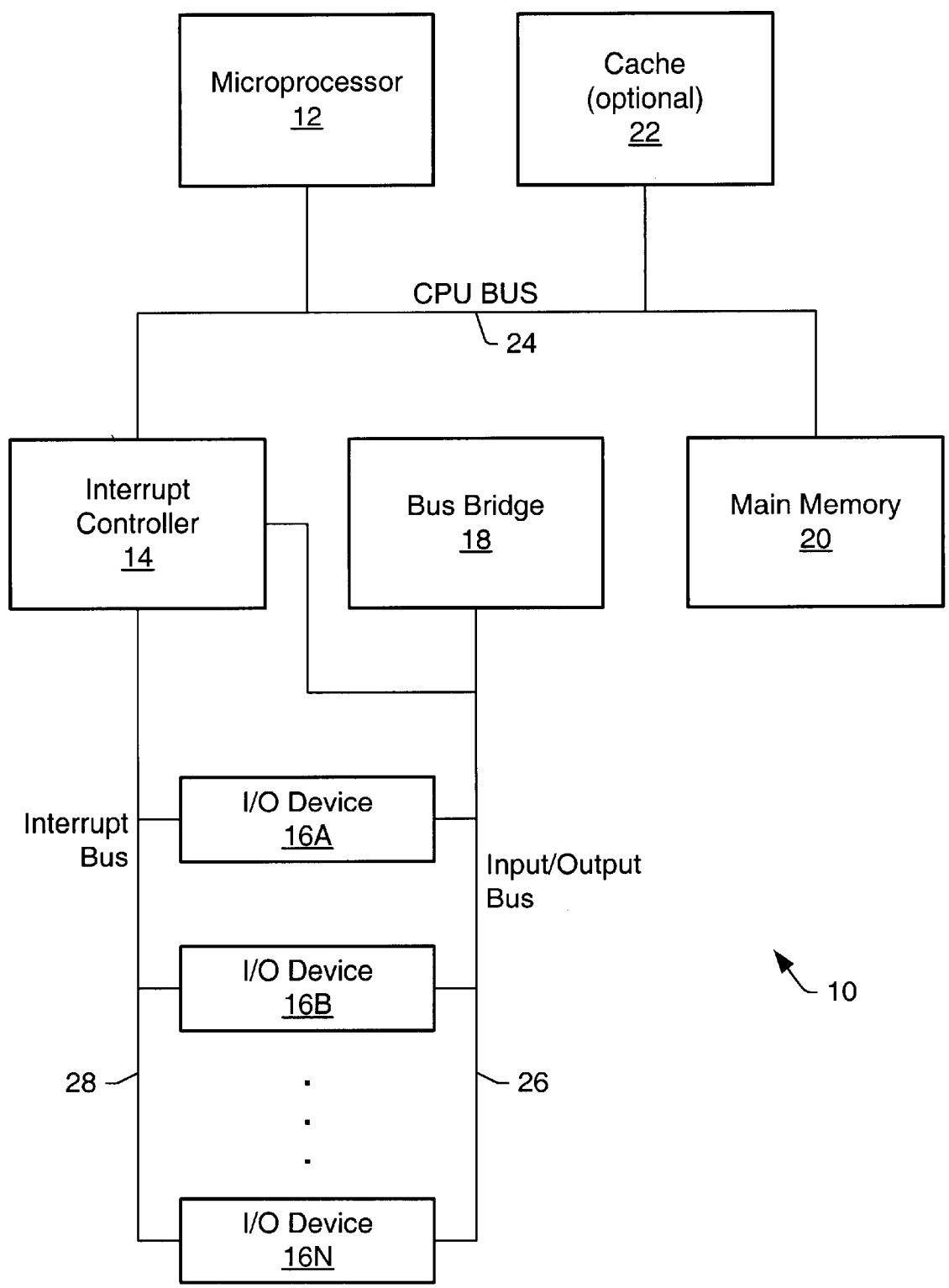
FIG. 1 is a block diagram of one embodiment of a computer system including a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a computer system 10 including a microprocessor 12, an interrupt controller 14, a plurality of input/output (I/O) devices 16A–16N (referred to collectively as I/O devices 16), a bus bridge 18, a main memory 20, and a cache 22 is shown. Microprocessor 12, interrupt controller 14, bus bridge 18, main memory 20, and cache 22 are coupled to a CPU bus 24 which effects high speed, high bandwidth communication between the connected devices. Lower speed, lower bandwidth communication is provided for I/O devices 16 via input/output bus 26. I/O devices 16 are coupled to interrupt controller 14 via an interrupt bus 28.

Microprocessor 12 includes hardware configured to store interrupt information associated with a plurality of interrupt vectors. If an interrupt is signaled by interrupt controller 14 and the interrupt information associated with the subsequently provided interrupt vector is stored within microprocessor 12, then microprocessor 12 may use the stored interrupt information to locate the interrupt service routine. Advantageously, bus clock cycles utilized to fetch interrupt information from main memory may be eliminated. Performance of the microprocessor may be increased over previous microprocessors not configured to store the interrupt information. Computer system 10 may achieve enhanced performance due to the more efficient handling of interrupts by microprocessor 12.

Interrupt bus 28 may include at least one interrupt conductor per I/O device 16A–16N. If one embodiment, several devices may share a particular interrupt conductor. An interrupt request signal conveyed on the associated interrupt conductor is indicative of a request for interrupt of microprocessor 12 by the associated I/O device 16A–16N. Interrupt controller 14 is configured to receive the interrupt request signals and to convey an interrupt signal to microprocessor 12 upon CPU bus 24 in response to the interrupt request signals. In one embodiment, interrupt controller 14 is similar to an 8259A interrupt controller used in IBM compatible personal computer systems. In another embodiment, interrupt controller 14 includes multiple interrupt controllers similar to the 8259A cascaded to allow a larger number of I/O devices 16 to be connected. Interrupt controller 14 is programmable, and may be enabled to assert the interrupt signal individually for each interrupt request signal. In other words, interrupt controller 14 may be enabled to assert the interrupt signal if the interrupt request signal from I/O device 16A is asserted but not if the interrupt request signal from I/O device 16B is asserted (or vice-versa). In another embodiment, interrupt controller 14 may be programmed with a priority scheme for the interrupt request signals. The priority scheme is devised such that, if multiple interrupt request lines are asserted concurrently: the highest priority interrupt request is serviced first; followed by the next highest priority interrupt request; etc.

Interrupt controller 14 provides the interrupt vector which identifies the location of the interrupt service routine associated with the interrupting I/O device 16A–16N. The interrupt vector is transferred across CPU bus 24 after microprocessor 12 acknowledges receipt of the interrupt signal. In one embodiment, microprocessor 12 issues an interrupt acknowledge bus transaction on CPU bus 24 when acknowledging the interrupt signal, and then issues a second interrupt acknowledge bus transaction to collect the interrupt vector. Other transactions upon CPU bus 24 are used to transfer data among devices coupled to CPU bus 24. An exemplary bus implementing such an interrupt acknowledge transaction may be found within the publication entitled: "16-bit and 32-bit Microprocessors Architecture, Software and Interfacing Techniques" by Singh, et al, Prentice Hall, Englewood Cliffs, N.J., 1991. This publication is incorporated herein by reference in its entirety. Often the interrupt acknowledge transactions are received by interrupt controller 14 upon a bus other than CPU bus 24. For example, the interrupt acknowledge bus transaction may be conveyed by bus bridge 18 onto I/O bus 26. Interrupt controller 14 is therefore shown coupled to I/O bus 26 in computer system 10. Interrupt controller 14 is, however, still coupled to the interrupt conductor of CPU bus 24 (to which microprocessor 12 is coupled). In other embodiments, interrupt controller 14 may receive interrupt acknowledge bus transactions directly from CPU bus 24 or from yet another bus coupled to CPU bus 24 via one or more bus bridges similar to bus bridge 18.

Bus bridge 18 is provided to assist in communications (other than interrupt requests) between I/O devices 16 and devices coupled to CPU bus 24. I/O devices 16 typically require longer bus clock cycles than microprocessor 12 and other devices coupled to CPU bus 24. Therefore, bus bridge 18 provides a buffer between CPU bus 24 and input/output bus 26. Additionally, bus bridge 18 translates transactions from one bus protocol to another. In one embodiment, input/output bus 26 as an Enhanced Industry Standard Architecture (EISA) bus and bus bridge 18 translates from the CPU bus protocol to the EISA bus protocol. In another embodiment, input/output bus 26 is a Peripheral Component Interconnect (PCI) bus and bus bridge 18 translates from the CPU bus protocol to the PCI bus protocol. It is noted that many variations of CPU bus protocols exist. Microprocessor 12 may employ any suitable bus protocol.

I/O devices 16 provide an interface between computer system 10 and other devices external to the computer system. Exemplary I/O devices include a modem, a serial or parallel port, a sound card, a disk drive, etc. I/O devices 16 may also be referred to as peripheral devices. Main memory 20 stores data and instructions for use by microprocessor 12. In one embodiment, main memory 20 is a dynamic random access memory (DRAM) comprising at least one DRAM cell and a DRAM controller. Cache 22 is a small, high speed memory for temporarily storing data and instructions from main memory 20. If microprocessor 12 requests an address from main memory 20 and cache 22 is storing data associated with the requested address, then cache 22 provides the data. Cache 22 is an optional component, computer system 10 is fully functional without it. However, cache 22 may improve the performance of computer system 10. It is noted that cache 22 may also be inserted between microprocessor 12 and CPU bus 24 in other embodiments.

A second embodiment of computer system 10 is contemplated in which I/O devices 16 are coupled to CPU bus 24. Interrupt controller 14 and bus bridge 19 are not included in this embodiment. Instead, each I/O device 16 individually responds to interrupt acknowledge bus transactions in a manner similar to interrupt controller 14. It is noted that, although computer system 10 includes one microprocessor as shown in FIG. 1, other embodiments of computer system 10 including multiple processors are possible. Such embodiments are contemplated.

Figure 2:
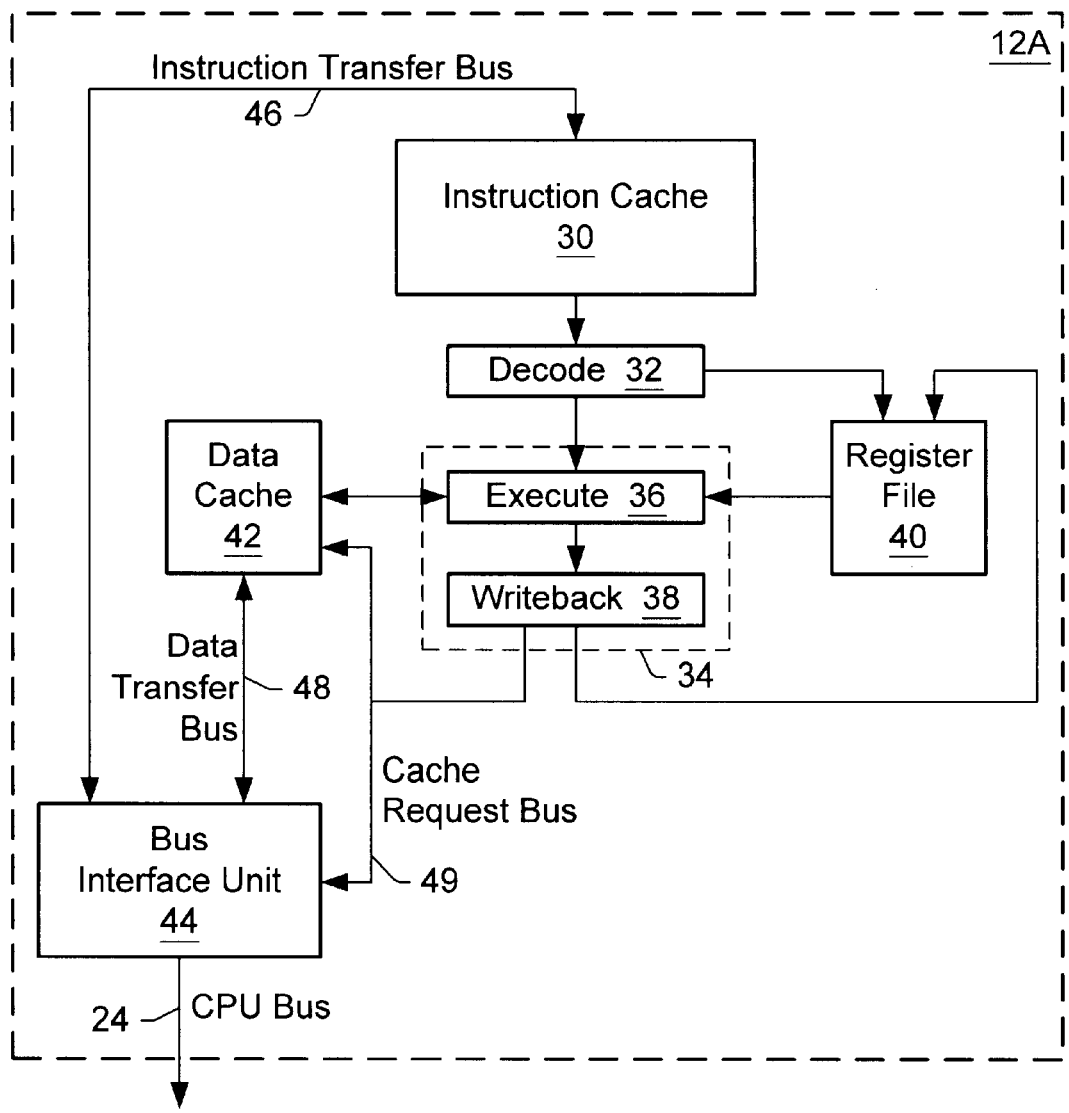
FIG. 2 is a block diagram of one embodiment of the microprocessor shown in FIG. 1.

Turning now to FIG. 2, a first embodiment 12A of the microprocessor 12 (shown in FIG. 1) is shown in block diagram form. Microprocessor 12A includes an instruction cache 30 coupled to a decode unit 32 which is in turn coupled to an execution unit 34. Execution unit 34 includes an execute stage 36 and a writeback stage 38. A register file 4 is coupled to decode unit 32, execute stage 36, and writeback stage 38. Microprocessor 12A also includes a data cache 42 coupled between execute stage 36 and a bus interface unit 44. Bus interface unit 44 is additionally coupled to instruction cache 30 and CPU bus 24.

Generally speaking, bus interface unit 44 includes an interrupt descriptor cache configured to store interrupt information associated with an interrupt vector. When interrupt information associated with a particular interrupt vector is initially fetched, the interrupt information is stored into the interrupt descriptor cache. Each time an interrupt vector is fetched, the interrupt descriptor cache is examined to determine if it contains interrupt information associated with that interrupt vector. If the information is found within the interrupt descriptor cache, then the information is used to form the instruction address of the interrupt service routine. Advantageously, bus cycles previously required to fetch the interrupt information are eliminated.

Bus interface unit 44 is further configured to monitor accesses by writeback stage 38 to data cache 42. If writeback stage 38 modifies a cache location storing interrupt information which is also stored within the interrupt descriptor cache, then the interrupt information within the interrupt descriptor cache is invalidated. For example, if the entries within one of the descriptor tables is modified and the modified entry identifies an interrupt service routine, then an entry or entries within the interrupt descriptor cache may be invalidated. In this manner, data which has been modified by microprocessor 12A is discarded from the interrupt descriptor cache. In one embodiment, the entire interrupt descriptor cache is invalidated when an update to the interrupt descriptor table is performed. It is noted that changes to the descriptor table are typically infrequent, and so invalidating the interrupt descriptor cache may have minimal effect upon performance. In another embodiment, only the entry directly affected by the change to the descriptor tables is invalidated. It is noted that an entry is "invalidated" if the data stored in the entry is ignored by the microprocessor. Exemplary forms of invalidation may include overwriting the data with new data and resetting a valid bit associated with the data.

Bus interface unit further monitors bus transactions for updates to descriptor table entries by other devices (such as other microprocessors). In another embodiment, bus interface unit 44 does not monitor the accesses to data cache 42. Instead, when a descriptor table entry is updated, the task performing the update is required to flush the cache. Therefore, the update is visible to bus interface unit 44 as a bus transaction and the affected entries may be invalidated.

Bus interface unit 44 includes interrupt response functionality. The response functionality includes receiving an interrupt signal, broadcasting an interrupt acknowledge bus transaction upon CPU bus 24, and broadcasting a separate interrupt acknowledge bus transaction upon CPU bus 24 to collect the interrupt vector. If an interrupt is signalled upon CPU bus 24, then the interrupt response functionality performs the typical interrupt handling functions.

When the interrupt signal is received in a state indicative of a request for interrupt, bus interface unit 44 conveys a signal indicative of interrupt to instruction cache 30. Logic within instruction cache 30 discards instructions currently being fetched and awaits the address of the interrupt service routine. Bus interface unit 44 reads the interrupt vector from interrupt controller 14 and performs the appropriate translation of the interrupt vector into an interrupt address. For example, in the x86 architecture the interrupt vector is used as an index into an interrupt descriptor table. More information regarding the x86 interrupt structure may be found in the publication entitled: "PC Magazine Programmer's Technical Reference: The Processor and Coprocessor" by Robert L. Hummel, Ziff-Davis Press, Emeryville, Calif., 1992. This publication is incorporated herein by reference in its entirety. Once instruction cache 30 receives the address of the interrupt service routine, code fetch and instruction execution begins at that address.

In addition to performing interrupt handling functions, bus interface unit 44 effects communication between microprocessor 12A and other devices coupled to CPU bus 24. For example, instruction code fetches which miss in instruction cache 30 are transferred from main memory 20 (shown in FIG. 1) to instruction cache 30 through bus interface unit 44. An instruction transfer bus 46 coupled between instruction cache 30 and bus interface unit 44 is employed to communicate the instruction code addresses to bus interface unit 44, as well as to communicate the fetched instructions to instruction cache 30. Additionally, data memory accesses which miss data cache 42 are transferred from main memory 20 to data cache 42. A data transfer bus 48 coupled between data cache 42 and bus interface unit 44 facilitates the data transfers. Data cache 42 may store modified data which must be written back to main memory 20, the transfer of which is also effected by bus interface unit 44.

Instruction cache 30 is a high speed cache memory capable of storing and retrieving instruction code. It is noted that instruction cache 30 may be configured as a set-associative or direct-mapped cache. Instructions fetched from instruction cache 30 are transferred to decode unit 32, which decodes the instruction to determine the operands used by the instruction as well as to bit-encode the instruction for execution unit 34. Decode unit 32 fetches register operands from register file 43 such that the values will be transferred to execution unit 34. In this manner, execution unit 34 receives its register operands during the same clock cycle that it receives its instruction.

Execution unit 34 includes execute stage 36 and writeback stage 38. Execute stage 36 executes the instruction provided by decode unit 32, producing a result. If the instruction utilizes a memory operand, the memory operand is transferred from data cache 42 prior to execution of the instruction. Writeback stage 38 stores the result generated by execute stage 36 into a destination specified by the instruction. The destination may be within register file 40 or data cache 42, in one embodiment. Results are conveyed for storage into data cache 42 upon a cache request bus 49. Cache request bus 49 is additionally coupled to bus interface unit 44 for maintaining the coherency of the interrupt descriptor cache.

It is noted that an instruction may be defined to invalidate the interrupt descriptor cache. When writeback stage 38 receives the instruction, an invalidate request is sent upon cache request bus 49 to bus interface unit 44. Bus interface unit 44 invalidates the interrupt descriptor cache upon receipt of the invalidate request upon cache request bus 49.

Register file 40 is configured to store register operands for use by execution unit 34. In one embodiment, register file 40 stores the x86 register set which includes the EAX, EBX, ECX, EDX, EBP, ESI, EDI and ESP registers. Additionally, register file 40 may store the segment registers of the x86 architecture, as well as other miscellaneous registers.

Data cache 42 is a high speed cache memory configured to store data bytes being manipulated by microprocessor 12A. It is understood that data cache 42 may be configured in a set associative or direct-mapped configuration.

Figure 3:
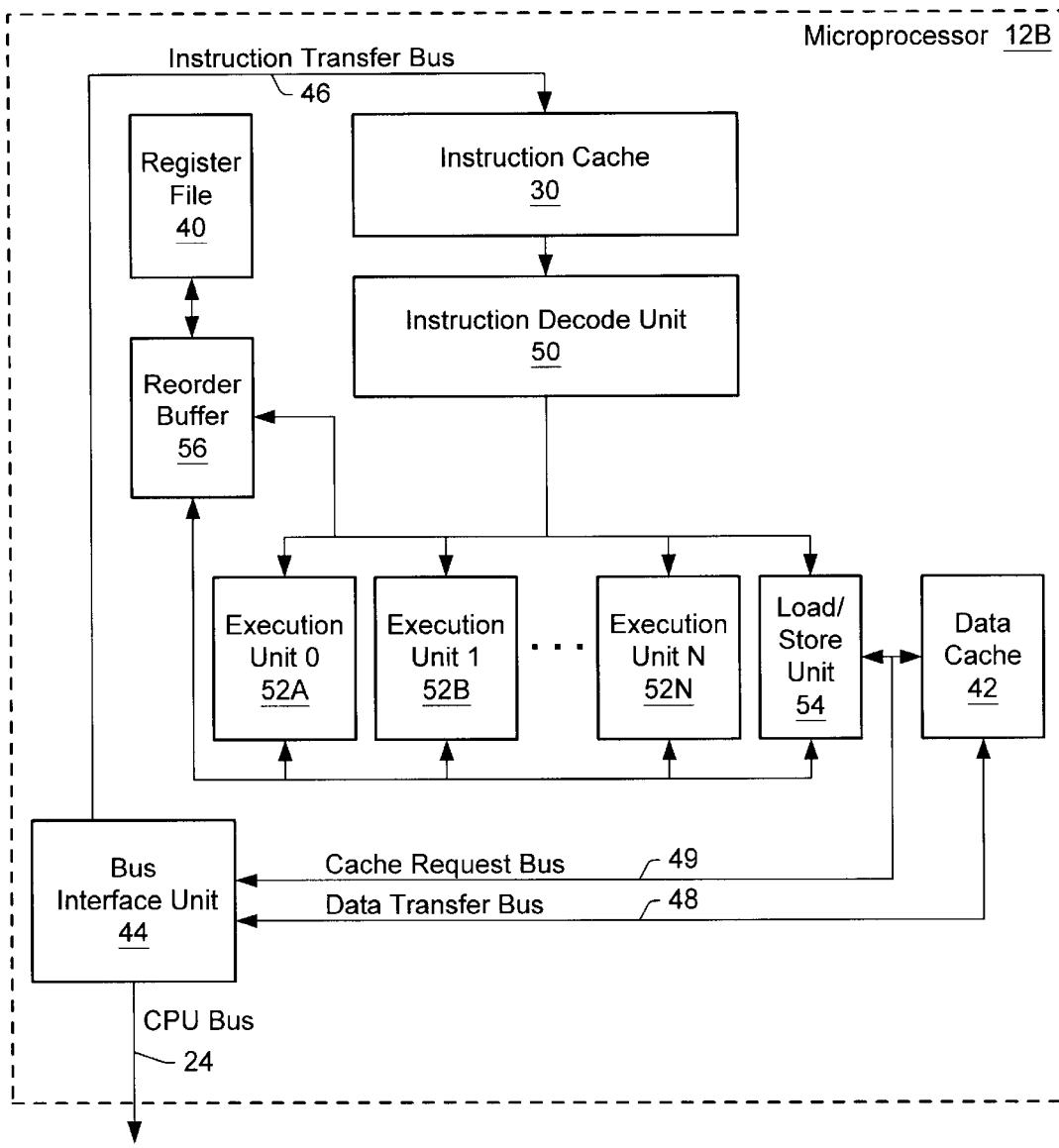
FIG. 3 is a block diagram of another embodiment of the microprocessor shown in FIG. 1.

Turning now to FIG. 3, a second embodiment of microprocessor 12 (microprocessor 12B) is shown as a block diagram. Similar to microprocessor 12A, microprocessor 12B includes a bus interface unit 44, an instruction cache 30, a data cache 42, and a register file 40. Bus interface unit 44 is coupled to instruction cache 30 via instruction transfer bus 46. Similarly, bus interface unit 44 is coupled to data cache 42 via data transfer bus 48. Additionally, microprocessor 12B includes a multiple instruction decode unit 50 coupled between instruction cache 30 and a plurality of execution units 52A–52N (referred to collectively as execution units 52). A load/store unit 54 is included to interface between execution units 52 and data cache 42. Finally, a reorder buffer 56 is coupled to decode unit 50, execution units 52, and load/store unit 54.

Microprocessor 12B is a superscalar microprocessor configured to execute multiple instructions during a clock cycle. Decode unit 50 therefore decodes multiple instructions during a single clock cycle and dispatches the instructions to execution units 52. Additionally, a storage location within reorder buffer 56 is allocated for each decoded and dispatched instruction. The storage locations are allocated to instructions in the order they occur within the task, so that the results created by executing the instructions may be recorded in register file 40 or data cache 42 in program order. By including reorder buffer 56, instructions may be speculatively executed out of order by execution units 52. In one embodiment, execution units 52 are asymmetrical execution units. Each execution unit 52A–52N is configured to execute a particular subset of microprocessor 12B's instruction set. The particular subset of the instruction set which execution unit 52A is configured to execute may differ from the particular subset of the instruction set which execution unit 52B is configured to execute. Similarly, other execution units may have differing particular subsets of the instruction set. In another embodiment, execution units 52 are symmetrical execution units. Each execution unit 52A–52N is configured to execute a similar subset of the instruction set.

Load/store unit 54 is configured to execute load and store (i.e. read and write) memory transactions to data cache 42 according to the task being executed by microprocessor 12B. Additionally, load/store unit 54 may be configured to detect memory dependencies between load and store instructions. Load/store unit 54 performs its read and write memory transactions upon a cache request bus 49 coupled to data cache 42 and bus interface unit 44. Bus interface unit 44 monitors cache request bus 49 for updates to descriptor table entries in order to maintain the coherency of the interrupt descriptor cache.

Reorder buffer 56 provides dependency checking and result forwarding such that each instruction receives the correct operand values prior to that instruction being executed. Reorder buffer 56 includes temporary storage for the result of each instruction until that instruction is retired. An instruction is retired by storing its result into register file 40 or data cache 42 (if needed) and deleting the instruction from reorder buffer 56. If an instruction decoded by decode unit 50 requires the result of an instruction which has not yet executed, then a tag indicative of which reorder buffer storage location will store that result is forwarded to the execution unit receiving the instruction in lieu of the operand value. The execution unit then monitors the results produced by the execution units for the provided tag. When the result is generated, the execution unit generating the result conveys the tag along with the result to reorder buffer 56. The execution unit awaiting the tag captures the result and stores it along with the instruction for later execution. Monitoring for the register tag and capturing the associated result is referred to as "result forwarding". It is noted that any suitable reorder buffer configuration may be employed by microprocessor 12B.

Execution units 52 and load/store unit 54 may employ reservation stations to store instructions dispatched to the unit. An instruction remains in the reservation station until all of its operands are available, and then is executed by the associated execution unit. It is noted that load/store unit 54 performs store memory accesses in program order. Reorder buffer 56 conveys a value to load/store unit 54 indicative of which store memory accesses may be performed. The store memory accesses are performed to data cache 42 or, in the case of a miss in data cache 42, to main memory 20 through bus interface unit 44. It is noted that the above mentioned reservation stations may be configured outside of the associated execution unit.

It is noted that, when an interrupt is signalled to microprocessor 12B, results stored in reorder buffer 56 may be discarded. The instruction most recently retired defines the context to be returned to. It is further noted that instruction cache 30 may employ branch prediction to further increase the performance or microprocessor 12B. Instruction cache 30 may employ any branch prediction mechanism.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377,843, filed Jan. 25, 1995 by Witt, et al. The disclosures of these patent applications are incorporated herein by reference in their entirety.

Figure 4:
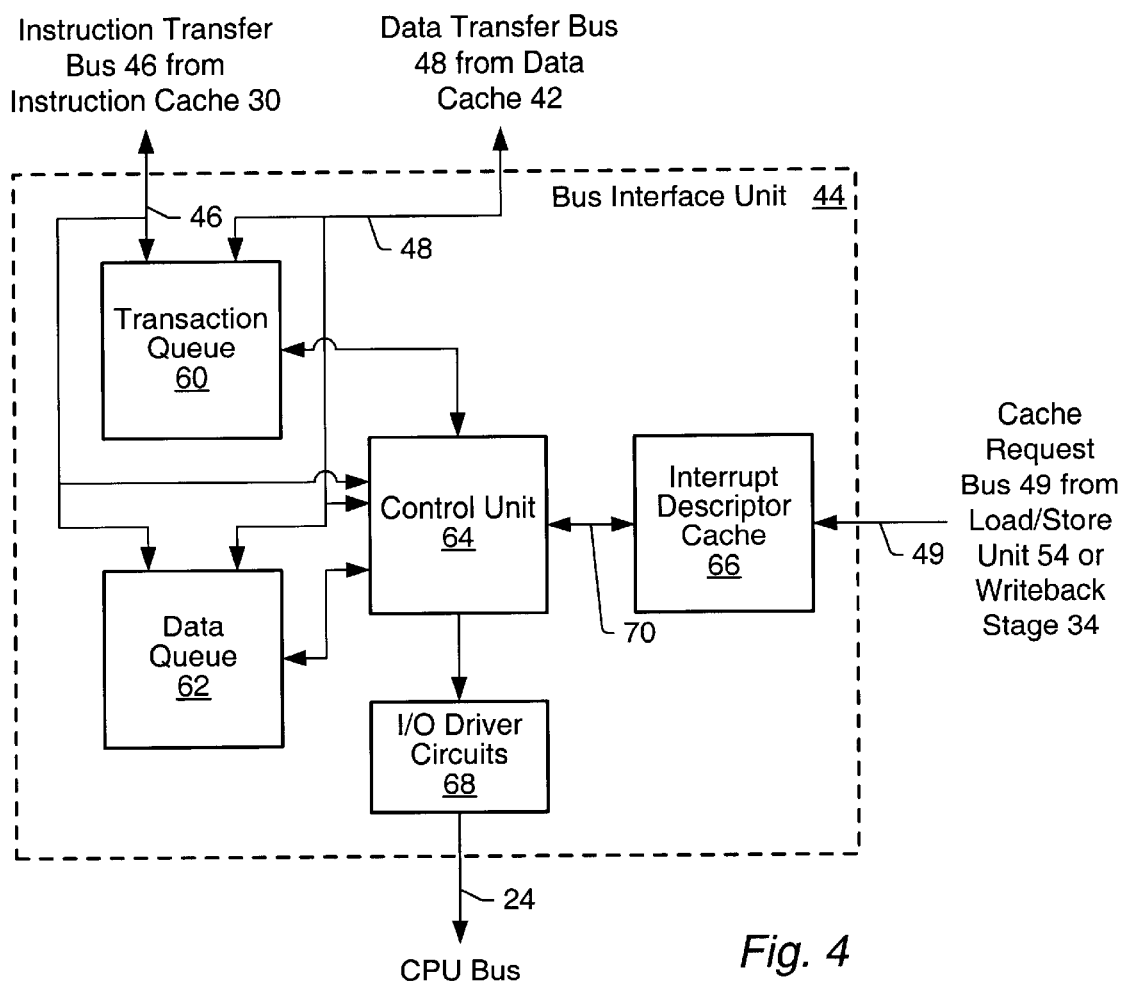
FIG. 4 is a block diagram of a bus interface unit including an interrupt descriptor cache, said bus interface unit is included within the microprocessors shown in FIGS. 2 and 3.

Turning next to FIG. 4, a block diagram of one embodiment of bus interface unit 44 (shown in FIGS. 2 and 3) is shown. Bus interface unit 44 is suitable for use in both microprocessors 12A and 12B, as well as in other embodiments of microprocessor 12. Bus interface unit 44 includes a transaction queue 60, a data queue 62, a control unit 64, an interrupt descriptor cache 66, and I/O driver circuits 68. Instruction transfer bus 46 and data transfer bus 48 are coupled to transaction queue 60, data queue 62, and control unit 64. Control unit 64 is coupled to transaction queue 60, data queue 62, I/O driver circuits 68, and instruction descriptor cache 66. Additionally, instruction descriptor cache 66 receives cache request bus 49. Cache request bus 49 is monitored by instruction descriptor cache 66 for updates to the information stored in interrupt descriptor cache 66. When an update is detected, the associated entry or entries within interrupt descriptor cache 66 are invalidated.

Coupled between control unit 64 and instruction descriptor cache 66 is a bus 70. Bus 70 includes signals indicative of a bus transaction conveyed upon CPU bus 24 for maintaining instruction descriptor cache 66 with respect to updates made by other devices coupled to CPU bus 24. Additionally, interrupt information fetched by control unit 64 in response to a particular interrupt is conveyed upon bus 70 for storage in interrupt descriptor cache 66. Still further, bus 70 is used by control unit 64 to determine if interrupt information associated with a received interrupt vector is stored in interrupt descriptor cache 66.

Upon receipt of an interrupt vector, control unit 64 conveys the interrupt vector to interrupt descriptor cache 66. If interrupt descriptor cache 66 is storing interrupt information associated with the interrupt vector, control unit 64 transmits the address of the interrupt service routine to instruction cache 30. Fetch and execution of the interrupt service routine begins with relatively few clock cycles after receipt of the interrupt vector, as opposed to many clock cycles in previous interrupt handling mechanisms. If the interrupt information associated with the interrupt vector is not stored in interrupt descriptor cache 66, control unit 64 transfers the interrupt information across CPU bus 24 from main memory. In one embodiment, two transfers are used. First, the interrupt descriptor table is read. Stored in the interrupt descriptor table is a value indicative of a particular global descriptor table entry. The particular global descriptor table entry is then read. The interrupt information thus collected is stored into interrupt descriptor cache 66, and the address of the interrupt service routine is conveyed to instruction cache 30.

It is noted that descriptor table information may be stored in data cache 42. Control unit 64 employs data transfer bus 48 to detect descriptor table entries in data cache 42 and to retrieve the data. Data cache 42 is searched prior to performing bus transactions to retrieve the descriptor table data.

In addition to performing interrupt acknowledge bus transactions to retrieve interrupt vectors, control unit 64 performs other bus transactions required by instruction cache 30 and data cache 42. Bus transactions are effected through I/O driver circuits 68. CPU bus 24 is typically a large capacitive load, as compared to circuits internal to microprocessor 12. I/O driver circuits 68 are configured to charge and discharge this larger load. Therefore, circuits internal to microprocessor 12 may be configured to drive the relatively smaller loads characterized by internal circuitry. Additionally, microprocessor 12 may be exposed to higher voltages than circuits internal to microprocessor 12 are capable of withstanding. I/O driver circuits 68 therefore provide a buffer between these higher voltages and the circuits within control unit 64.

Bus transactions requested by instruction cache 30 and data cache 42 are stored in transaction queue 60. Control unit 64 performs the transactions in transaction queue 60 according to a priority scheme designed to maximize the performance of microprocessor 12. In one embodiment, for example, read transactions are prioritized ahead of write transactions (as long as the transactions are to dissimilar addresses). Microprocessor 12 may require the data associated with a read transaction, while write transactions are an update to memory and often are not immediately needed by microprocessor 12. Data associated with transactions in transaction queue 60 is temporarily stored in data queue 62. Data for read transactions is then later transferred to instruction cache 30 or data cache 42 (depending on the origin of the transaction). Data for write transactions is transferred to memory as a part of the associated write transaction.

Figure 5:
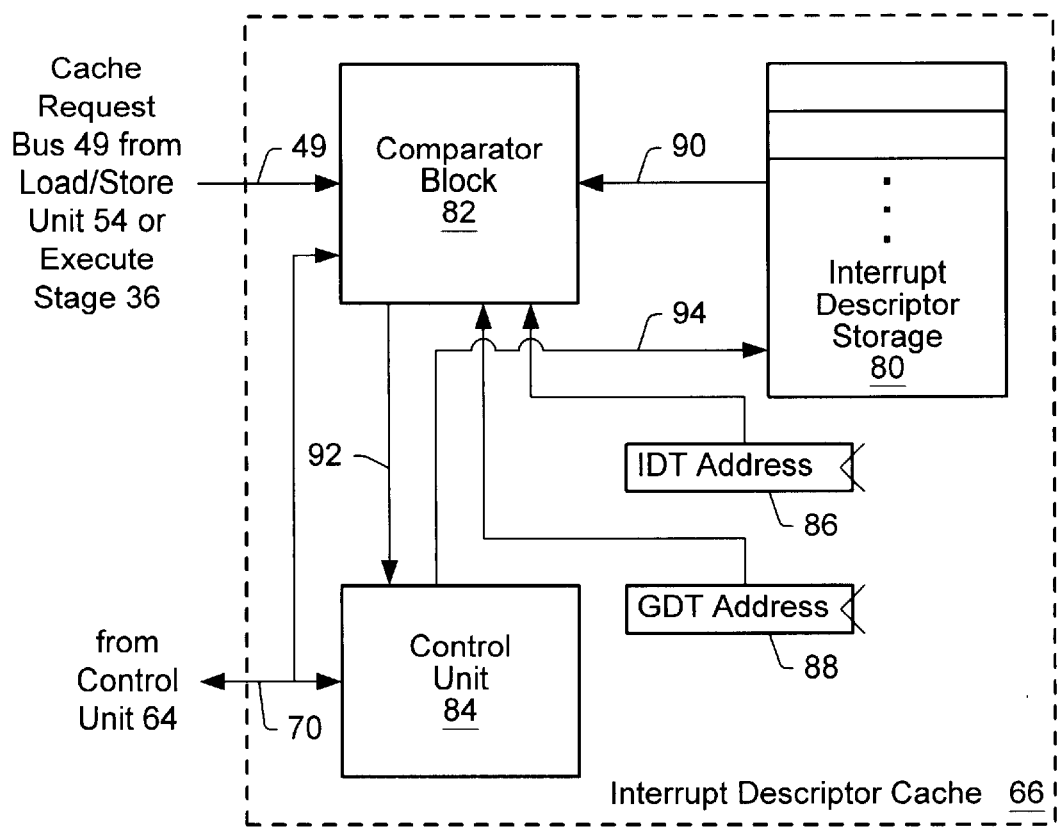
FIG. 5 is a block diagram of the interrupt descriptor cache shown in FIG. 4.

Turning next to FIG. 5, a block diagram of one embodiment of interrupt descriptor cache 66 is shown. Interrupt descriptor cache 66 includes an interrupt descriptor storage 80, a comparator block 82, a control unit 84, and a pair of registers 86 and 88. Control unit 84 is coupled to bus 70 from bus interface unit 44, and is coupled to comparator block 82 and interrupt descriptor storage 80. Comparator block 82 is coupled to interrupt descriptor storage 80, cache request bus 49 and bus 70. Additionally, registers 86 and 88 are coupled to comparator block 82.

Interrupt descriptor storage 80 includes a plurality of storage locations. Each storage location is configured to store interrupt information associated with an interrupt vector. In one embodiment, interrupt descriptor storage 80 includes eight storage locations. It is noted that, when interrupt descriptor cache 66 is included in a microprocessor employing the x86 microprocessor architecture, interrupt descriptor cache 66 may not be configured with enough entries to store interrupt information associated with the 256 possible interrupt vectors. However, many computer system configurations allow only a small number of interrupt vectors to be used. For example, many x86 microprocessor based computer systems limit the number of interrupt request signals available to I/O devices. Since an interrupt vector is chosen by the interrupt controller based upon the interrupt request signals, the number of interrupt vectors are similiarly limited. Therefore, it may not be advantageous in current computer systems to include 256 storage locations in interrupt descriptor storage 80.

Because interrupt descriptor storage 80 may not be configured with a number of storage locations equal to the number of interrupt vectors, interrupt descriptor storage 80 is managed by control unit 84 when new interrupt information is to be stored into interrupt descriptor cache 66. When new interrupt information is received by control unit 84 across bus 70, an available storage location is chosen. A storage location is available if it is not storing valid interrupt information. If the storage locations are each storing valid interrupt information, then the storage location containing the least recently accessed interrupt information is overwritten with the new interrupt information. Interrupt descriptor storage 80 may be a plurality of registers in one embodiment, or an array comprising a plurality of storage locations in another embodiment.

Comparator block 82 is configured to receive interrupt information from interrupt descriptor storage 80 upon a bus 90 coupled therebetween. Included in the interrupt information are values indicative of the entries within the interrupt descriptor table and global descriptor table which store the interrupt information. For example, a microprocessor employing the x86 microprocessor architecture chooses an entry in the interrupt descriptor table based on the interrupt vector. A segment selector value stored in the interrupt descriptor table is used to select an entry within the global descriptor table. Both the segment selector and the interrupt vector are stored in interrupt storage 80 for embodiments of interrupt descriptor cache 66 which are included in microprocessors employing the x86 microprocessor architecture.

Comparator block 82 is further coupled to cache request bus 49 and bus 70. Cache requests and bus transactions which indicate that one of the descriptor tables are being updated are received upon these buses. Furthermore, registers 86 and 88 are coupled to comparator block 82. In one embodiment, an address defining the beginning of the interrupt descriptor table is stored in register 86. A second address defining the beginning of the global descriptor table is stored in register 88. The address of the interrupt descriptor table is combined with each interrupt vector to form addresses which are compared against the cache request and bus transaction addresses. Similarly, the second address defining the global descriptor table is combined with the segment selector value to form addresses which are compared against the cache request and bus transaction addresses. If an update to one of the descriptor tables is detected by comparator block 82, an associated signal upon a bus 92 coupled to control unit 84 is asserted. Control unit 84, upon detection of an asserted signal from comparator block 82, invalidates the associated entry. Invalidations, as well as updates to interrupt descriptor storage 80, are conveyed upon a bus 94 coupled between control unit 84 and interrupt descriptor storage 80.

In another embodiment, comparator block 82 is configured to detect updates to any entry of the interrupt descriptor table and global descriptor table. Each storage location within interrupt descriptor storage 80 is invalidated upon detection of an update to the descriptor tables. Such an embodiment may be useful if the descriptor tables are seldom updated.

It is noted that registers 86 and 88 may contain copies of the descriptor table addresses, wherein the actual values as updated by software are within another pair of registers elsewhere within microprocessor 12. When registers 86 and 88 contain copies, they are often referred to as "shadow registers".

Control unit 84 assembles interrupt information to be stored in interrupt descriptor storage 80. The interrupt vector is provided first, when the interrupt information is determined to miss in interrupt descriptor cache 66 (i.e. the interrupt information is not stored in interrupt descriptor cache 66). The information stored in the selected interrupt descriptor table entry is provided next, followed by information stored in the global descriptor table. Once all of the information is received and formatted for storage by control unit 84, the information and control signals for writing the information into the selected storage location of interrupt descriptor storage 80 are conveyed upon bus 94. Control unit 24 is additionally configured to receive an indication of execution of the invalidate interrupt descriptor cache instruction described above. All entries within interrupt descriptor storage 80 are invalidated upon receipt of the indication. Finally, control unit 84 conveys interrupt information upon bus 70 in response to an interrupt vector for which the interrupt information is stored within interrupt descriptor storage 80.

Figure 6:
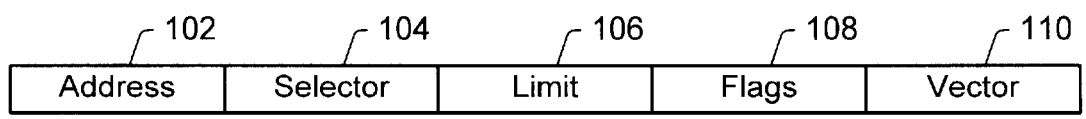
FIG. 6 is a diagram of exemplary information stored within one embodiment of the interrupt descriptor cache shown in FIG. 4.

Turning now to FIG. 6, an exemplary set of interrupt information 100 stored within interrupt descriptor cache 66 is shown. Interrupt information 100 includes an offset field 102, a selector field 104, a limit field 106, a flags field 108, and a vector field 110.

Vector field 110 stores the interrupt vector associated with interrupt information 100, as well as a value indicative of the validity of interrupt information 100. The validity value is set and reset by control unit 64 as described above. Address field 102 stores an address indicative of the beginning of the associated interrupt service routine. In one embodiment, address field 102 is formed by adding the base address of the segment (stored in the global descriptor table) to the offset stored in the interrupt descriptor table entry identified by interrupt vector field 110. Address field 102 may be 32 bits wide according to this embodiment.

Selector field 104 contains the selector stored in the interrupt descriptor table entry identified by interrupt vector field 110. Selector field 104, when used in conjunction with the address defining the global descriptor table, identifies the entry within the global descriptor table which defines the code segment containing the interrupt service routine. In one embodiment, selector field 104 is 16 bits wide. Limit field 106 is the limit of the code segment containing the interrupt service routine. The limit defines the size of the code segment, and is stored in the global descriptor table entry identified by selector field 104. In one embodiment, limit field 106 is 20 bits wide.

Flags field 108 stores protection Information associated with the interrupt vector, as defined in the interrupt descriptor table and global descriptor table entries associated with the interrupt vector. In one embodiment, the flags field is 9 bits wide and includes a G bit, D bit, C bit, R bit, AVL bit, TYPE bits, and DPL bits.

The G bit defines the granularity of the limit field 106. If the G bit is set, the limit field defines the number of pages in the segment. If the G bit is clear, the limit field defines the number of bytes within the segment. A page is a number of contiguous bytes of main memory, and may include 4 kilobytes in one example.

In another embodiment, the G bit may be eliminated and limit field 106 expanded to 32 bits. The limit value stored in this embodiment defines the number of bytes within the segment. If the G bit is set in the associated descriptor table entry, then the limit bits are placed into the most significant bits of limit field 106. If the G bit is clear, then limit bits are placed into the least significant bits of limit field 106.

The D bit defines whether the segment is operating in one of two operand modes. In one embodiment, the D bit being set indicates that the segment operates in 32-bit operand mode. The D bit being clear indicates that the segment operates in 16-bit operand mode. The operand mode defines the default size of operands for instructions.

The DPL bits in flags field 108 are used within the INT instruction of the x86 microprocessor architecture. The DPL bits are compared against the privilege level of the task executing the INT instruction to determine if the task is of sufficient privilege level to execute the interrupt service routine. Privilege level is defined in further detail below, in the discussion of FIG. 7.

Read access rights to the segment containing the interrupt service routine are determined by the R bit. If the R bit is set, then bytes within the code segment may be read by an instruction as if the bytes are data. If the R bit is clear, the bytes within the code segment may be fetched as instructions but may not be accessed as data by the instructions.

The AVL bit is provided for use by the operating system executing upon microprocessor 12. Its meaning is operating system dependent. The TYPE bits define the segment as a task gate, interrupt gate, or trap gate. A task gate causes the interrupt to be handled as a task switch. Interrupt and trap gates cause the interrupt not to be handled as a task switch. Additionally, interrupt gates do not allow the interrupt service routine to be interrupted, whereas task gates and trap gates allow the interrupt service routine to be interrupted.

It is noted that, in one embodiment, the interrupt descriptor table stores the DPL bits and the TYPE bits. The global descriptor table stores the G bit, the D bit, the AVL bit, the C bit, the R bit, and the A bit. Furthermore, the limit field and the base address of the segment are stored in the global descriptor table, and the selector field and offset are stored in the interrupt descriptor table.

Figure 7:
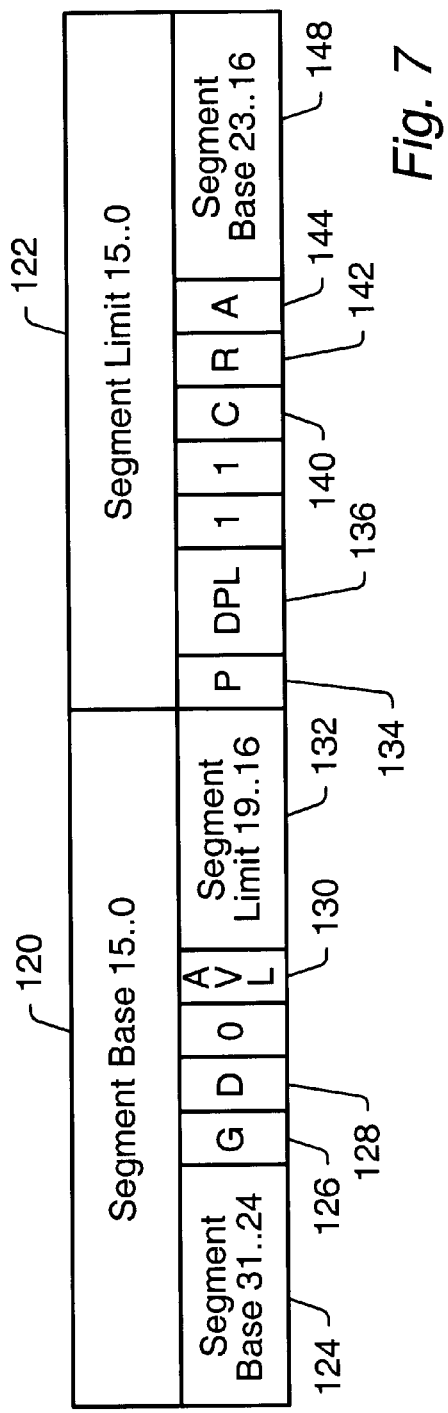
FIG. 7 shows an exemplary global descriptor table entry.

Turning now to FIG. 7, an exemplary global descriptor table entry is shown. It is noted that the global descriptor table entry shown is a code segment. The exemplary global descriptor table entry includes two 32 byte portions. The first portion includes the low order 16 bits of segment base address (field 120). The high order bits of the segment base address are stored in fields 124 and 148. The segment base address defines the beginning of the segment in memory. All bytes within the segment reside at addresses in memory greater than the base address. The first portion of the global descriptor table entry also includes the low order bits of the segment limit (field 122). The remainder of the segment limit is stored in field 132. The G, D, AVL, DPL, C, and R bits, as described above, are stored in fields 126, 128, 130, 136, 140, and 142, respectively. It is noted that the DPL bits stored in field 130 differ from the DPL bits described above. The DPL bits in field 136 determine the privilege level of the interrupt service routine. As will be appreciated by those skilled in the art, the privilege level defines the access rights of a task. Certain areas of memory and registers within microprocessor 12 may be reserved for access by only the higher privilege levels. Typically, the privilege level of the microprocessor when executing an interrupt service routine is set to the value of the DPL bits in field 136. However, if the C bit is set and the privilege level of the task being interrupted is greater than the DPL bits, the privilege level is unchanged.

Additionally, a P bit (field 134) and an A bit (field 144) are defined. If the P bit is set, then the global descriptor table entry is valid. If the P bit is clear, then the global descriptor table entry is invalid. The A bit, when set, indicates that the segment has been accessed. When clear, the A bit indicates that the segment has not been accessed.

Figure 8:
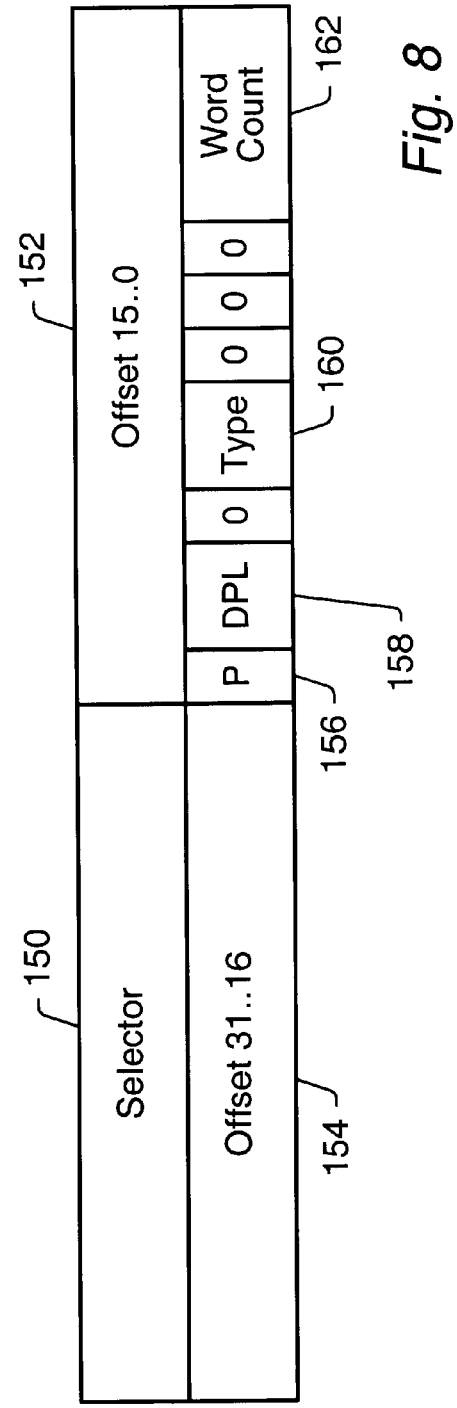
FIG. 8 shows an exemplary interrupt descriptor table entry.

Turning now to FIG. 8, an exemplary interrupt descriptor table entry is shown. The selector field 150 stores a selector value which identifies the global descriptor table entry storing the remainder of the interrupt information. The value stored in field 150 is stored into selector field 104 (shown in FIG. 6) within interrupt descriptor cache 66. The least significant bits of the offset are stored in field 152, while the most significant bits of the offset are stored in field 154. The offset is added to the segment base address to produce the address field 102 of the interrupt information shown in FIG. 6. P bit field 156 is similar to P bit field 134 shown in FIG. 7. DPL field 158 stores the privilege level associated with the interrupt service routine. Word count field 162 is ignored for task, interrupt, and trap gates.

TYPE field 160 includes more than the two bits defined for interrupt information 100 in FIG. 6. However, the information needed in order to execute the interrupt service routine properly is whether or not the interrupt is handled according to a task, interrupt, or trap gate. Therefore, only two bits are stored for the TYPE field within interrupt descriptor cache 66.

It is noted that, although the above discussion often uses the x86 microprocessor architecture as exemplary microprocessor architecture for microprocessor 12, other microprocessor architectures which allow interrupt service routines to be stored at selectable addresses may benefit from the above disclosure. Such embodiments are contemplated.

It is further noted that the above discussion often refers to signals as being "asserted" or "deasserted". As used herein, a signal is "asserted" if it conveys a value indicative of a particular piece of information. Conversely, a signal is "deasserted" if it conveys a value indicative of a lack of a particular piece of information. A signal may be defined to be asserted when it conveys a logical zero value or, conversely, when it conveys a logical one value.

It is still further noted that, although the above description locates the interrupt descriptor cache within the bus interface unit, many locations within the microprocessor may be suitable for the interrupt descriptor cache. Additionally, interrupt processing logic (such as fetching the interrupt information and generating the interrupt service routine address) may be located in other units than the bus interface unit.

In accordance with the above disclosure, an interrupt descriptor cache has been described. Advantageously, interrupt information may be scored within the microprocessor. At least two bus transactions formerly required to fetch interrupt information from memory may be eliminated. Performance may be increased due to the more efficient handling of interrupts by the present microprocessor.

Numerous variations and modifications will become apparent to those skilled in the art once the above disclosure is fully appreciated. It is intended that the following claims be interpreted to embrace all such variations and modifications.

What is claimed is:
1. A microprocessor comprising:
an interrupt descriptor cache including a plurality of storage locations wherein each one of said plurality of storage locations is configured to store interrupt information associated with an interrupt vector, wherein said interrupt information comprises an instruction address which locates the beginning of an interrupt service routine; and
a control unit configured to cause said interrupt information to be stored into said interrupt descriptor cache and further configured to transfer said interrupt information across a bus.

2. The microprocessor as recited in claim 1 wherein said instruction address comprises an offset and a selector.

3. The microprocessor as recited in claim 2 wherein said selector identifies a segment of memory.

4. The microprocessor as recited in claim 3 wherein said offset identifies a memory location within said segment at which said interrupt service routine begins.

5. The microprocessor as recited in claim 3 wherein said interrupt information further comprises a plurality of flags indicative of attributes associated with said segment.

6. The microprocessor as recited in claim 3 wherein said interrupt information further comprises a segment limit identifying the size of said segment in bytes.

7. The microprocessor as recited in claim 1 wherein each of sand plurality of storage locations is further configured to store said interrupt vector.

8. The microprocessor as recited in claim 1 wherein said interrupt descriptor cache further includes a second control unit coupled to said control unit, and wherein said second control unit is configured to monitor access to memory locations storing said interrupt information.

9. The microprocessor as recited in claim 8 wherein said interrupt descriptor cache further includes a comparator block coupled to said control unit and said second control unit, wherein said comparator block is configured to compare addresses associated with accesses to said memory locations to addresses storing said interrupt information.

10. The microprocessor as recited in claim 9 further comprising a data cache coupled to said comparator block, wherein said comparator block is configured to compare addresses of accesses to said data cache to addresses storing said interrupt information.

11. The microprocessor as recited in claim 8 wherein said second control unit is configured to invalidate said interrupt information within said plurality of storage locations if said memory locations are updated.

12. The microprocessor as recited in claim 8 wherein said memory locations comprise an interrupt descriptor table configured to store said interrupt information according to said interrupt vector.

13. The microprocessor as recited in claim 8 wherein said memory locations comprise a global descriptor table configured to store information regarding instruction and data segments.

14. A method for storing interrupt information associated with an interrupt vector within a microprocessor comprising:
transferring said interrupt information from a main memory coupled to said microprocessor into said microprocessor upon a first occurrence of said interrupt vector;
storing said interrupt information within an interrupt descriptor cache; and
retrieving said interrupt information from said interrupt descriptor cache upon a second occurrence of said interrupt vector.

15. The method as recited in claim 14 further comprising monitoring memory accesses to detect updating of said interrupt information in said main memory.

16. The method as recited in claim 15 further comprising invalidating said interrupt information within said interrupt descriptor cache if said interrupt information is updated.

17. A computer system comprising:

a microprocessor comprising an interrupt descriptor cache configured to store interrupt information associated with a plurality of interrupt vectors, wherein said interrupt information comprises an instruction address which locates the beginning of an interrupt service routine; and an interrupt controller coupled to said microprocessor wherein said interrupt controller is configured to convey said interrupt vector to said microprocessor according to a plurality of interrupt request signals.

18. The computer system as recited in claim 17 further comprising a plurality of input/output devices coupled to said interrupt controller, wherein each of said plurality of input/output devices is configured to convey at least one of said plurality of interrupt request signals.

19. The computer system as recited in claim 17 further comprising a main memory coupled to said microprocessor wherein said main memory is configured to store instructions comprising interrupt service routines and interrupt information.

20. The computer system as recited in claim 17 wherein said microprocessor further comprises a control unit configured to cause said interrupt information to be stored into said interrupt descriptor cache and further configured to transfer said interrupt information across a bus.

* * * * *

UNITED STATES PATENT AND TRADEMARK OFFICE
CERTIFICATE OF CORRECTION

PATENT NO. : 6,378,023 B1 Page 1 of 1
DATED : April 23, 2002
INVENTOR(S) : David S. Christie and Brian C. Barnes It is certified that error appears in the above-identified patent and that said Letters Patent is hereby corrected as shown below:

<u>Column 16,</u>
Line 28, please delete "sand", and insert -- said -- in place thereof.

Signed and Sealed this

Twenty-fifth Day of June, 2002

*Attest:*

*Attesting Officer*

JAMES E. ROGAN
*Director of the United States Patent and Trademark Office*